UNITED STATES PATENT OFFICE.

HENRY S. BLACKMORE, OF MOUNT VERNON, NEW YORK.

PROCESS OF MAKING ALKALI SALTS.

SPECIFICATION forming part of Letters Patent No. 513,001, dated January 16, 1894.

Application filed April 27, 1893. Serial No. 472,040. (No specimens.)

*To all whom it may concern:*

Be it known that I, HENRY S. BLACKMORE, a citizen of the United States, residing at Mount Vernon, in the county of Westchester and State of New York, have invented new and useful Improvements in Processes of Producing Salts of the Alkalies from their Silicious Combinations, of which the following is a specification.

The object of this invention is to produce soluble non-silicious salts of alkalies, such as potassium, sodium, lithium, caesium, and rubidium from their silicates which exists naturally in many insoluble minerals such as orthoclase, albite, petalite and many others, said soluble non-silicious salts being of such a nature, that they will not absorb, dissolve, combine with or otherwise become contaminated by the free silica or silicious material with which said salts may be in contact after their formation, so that the same can be readily separated from the by-products by lixiviation or filtration, and decantation, and the danger that the whole mass may assume a gelatinous condition, is avoided.

The following example shows how my invention can be executed in practice: In order to produce a soluble non-silicious potassium salt of the nature above stated I take orthoclase which is composed principally of a double silicate of aluminum and potassium, reduce the same to a fine powder and mix it with finely powdered calcium chlorid in about equivalent proportions to the potassium silicate present and to this mixture I add an excess of calcium oxid and a sufficient quantity of water to render the entire mass moist. This moist mass is introduced into a sealed furnace or retort and heated to a high temperature, say about 1,100° centigrade, whereby the water previously mixed with the mass is converted into superheated steam of a high pressure which produces a disintegrating action and assists materially in the transformation of the orthoclase into soluble potassium chlorid and insoluble silicates of calcium and aluminum. The heating is continued for about two hours and it is obvious that when the moisture expands in the sealed retort and becomes steam, the mixture is brought under superatmospheric pressure, thus causing the materials to be brought in close contact, thereby hastening the chemical action and thus shortening the time required to complete the reaction. After the mass has cooled, it is placed into tanks or vats and lixiviated. This step may be facilitated by passing live steam through the mass in order to heat and keep the same in a state of constant agitation and ebullition, thus dissolving the potassium chlorid out from the by-products, the liquor containing the potassium chlorid being finally separated from the residue by filtration or decantation. From this liquor the potassium chlorid is obtained by evaporation and, if desired, by subsequent crystallization. The chemical transformation which takes place during this process can be illustrated by the following formulas:

1. Separation of the alkali:

$$K_2SiO_3 + CaO = K_2O + CaSiO_3$$
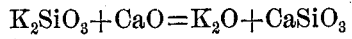

2. Production of alkali salt and quick lime:

$$K_2O + CaSiO_3 + CaCl_2 = 2KCl + CaSiO_3 + CaO.$$

It is obvious that other minerals such as albite, which contains sodium silicate, or petalite which contains lithium silicate or mixtures of two or more of such minerals, can be treated according to my invention and instead of calcium chlorid I can use calcium sulfate, calcium oxy-sulfid (sulfur waste) or calcium oxy-chlorid (bleaching powder) or any other combination of calcium which when mixed with a small portion of calcium oxid and brought in contact with the powdered mass above named in the presence of heat and superheated steam will produce the desired result.

The proportion of calcium salt used varies according to the alkali salt to be separated, the mineral operated on and the amount of alkali silicates and free silica present, all of which will have to be ascertained before commencing the operation, the quantity of calcium salt being added in about equivalent molecular proportions to the alkali silicates present, and an excess of quick lime is added to start the reaction.

In place of calcium oxid and a calcium salt

I can use the oxid and salt of another earth metal such as barium, strontium and magnesium.

In all cases the alkali salt produced has the property that it will not absorb, dissolve, combine with or otherwise become contaminated by the free silica or silicious material with which it may be in contact after its formation.

What I claim as new, and desire to secure by Letters Patent, is—

The process of producing soluble non-silicious salts of the alkalies from insoluble combinations or mixtures containing alkali silicates which consists in exposing the alkali silicates to the action of the oxid and the salt of an earth metal at a high temperture in the presence of superheated steam under superatmospheric pressure, then cooling the mass and finally separating the soluble alkali salt or salts produced substantially as described.

In testimony whereof I have hereunto set my hand in the presence of two subscribing witnesses.

HENRY S. BLACKMORE.

Witnesses:
WM. C. HAUFF,
E. F. KASTENHUBER.